US009610897B2

(12) United States Patent
Huelke et al.

(10) Patent No.: US 9,610,897 B2
(45) Date of Patent: Apr. 4, 2017

(54) MULTI-FUNCTION/POSITION COVER SYSTEM FOR A VEHICLE CARGO AREA

(71) Applicant: FORD GLOBAL TECHNOLOGIES, LLC, Dearborn, MI (US)

(72) Inventors: David Huelke, Birmingham, MI (US); Scott Holmes Dunham, Redford, MI (US); Peter David Alexander Jones, Birmingham, MI (US); Daniel Clifford, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 27 days.

(21) Appl. No.: 14/709,554

(22) Filed: May 12, 2015

(65) Prior Publication Data

US 2016/0332579 A1 Nov. 17, 2016

(51) Int. Cl.
*B60N 3/00* (2006.01)
*B60R 5/04* (2006.01)

(52) U.S. Cl.
CPC .................. *B60R 5/047* (2013.01)

(58) Field of Classification Search
CPC ..................................... B60R 5/047
See application file for complete search history.

(56) References Cited

U.S. PATENT DOCUMENTS

| 3,050,075 | A | * | 8/1962 | Kaplan | B60J 11/02 135/115 |
| 4,202,577 | A | | 5/1980 | Breitschwerdt et al. | |
| 5,083,831 | A | | 1/1992 | Foyen | |
| 6,012,759 | A | * | 1/2000 | Adamek | B60J 11/02 296/136.03 |
| 6,568,732 | B2 | | 5/2003 | De Gaillard | |
| 6,843,518 | B2 | | 1/2005 | Schlecht et al. | |
| 8,465,079 | B2 | * | 6/2013 | Saito | B60R 5/047 296/100.16 |
| 9,016,758 | B1 | * | 4/2015 | Lee | B60R 5/047 296/100.11 |
| 2009/0167043 | A1 | * | 7/2009 | Aebker | B60R 5/045 296/37.16 |
| 2012/0145338 | A1 | | 6/2012 | Takemura et al. | |

FOREIGN PATENT DOCUMENTS

DE 4313855 A1 11/1994

OTHER PUBLICATIONS

English machine translation of DE4313855.

* cited by examiner

*Primary Examiner* — Lori L Lyjak
(74) *Attorney, Agent, or Firm* — Vichit Chea; King & Schickli, PLLC

(57) ABSTRACT

A vehicle having first and second seat rows supported by a floor and a lift gate for accessing a cargo area partially defined by the second seat row, the floor, and the lift gate includes first and second flexible covers positioned within at least one cassette in a retracted position. The at least one cassette is positioned adjacent a floor of the vehicle behind the second seat row. At least one of the first and flexible covers may include a pass through door allowing for storage of elongated cargo when at least a portion of the second seat row is folded down. The pass through door may be secured in a closed position by a zipper, a hook and loop fastener, at least one magnet, or at least one snap.

20 Claims, 7 Drawing Sheets

MULTI-FUNCTION/POSITION COVER SYSTEM FOR A VEHICLE CARGO AREA

TECHNICAL FIELD

This document relates generally to cover systems for vehicle cargo areas, and more specifically to a multi-function/position cover system.

BACKGROUND

It is known to provide flexible covers, often positioned within a housing or cassette, to protect rear cargo areas of vehicles. Typically, these flexible covers are positioned in a cassette mounted adjacent the head rests of a second seat row. The flexible covers are extendable from their normal, retracted position downward, rearward and/or forward in order to prevent visibility into a rear cargo area, or to provide shading or floor protection. Placement of the one or more flexible covers in this position adjacent the head rests leaves the rear cargo area exposed when the second seat row is collapsed or folded down. In this scenario, at least the forward portion of the rear cargo area is visible through one or more side windows. Even more, the utilization of more than one flexible cover is not always required and a single cassette with multiple covers positioned in the cargo area can be cumbersome within the vehicle.

Accordingly, a need exists for a cover system for a vehicle that prevents visibility into the rear cargo area even when the second seat row, or even a portion of the second seat row in the situation where multiple, divided seats form the row, is folded down. Such a cover system would also preferably minimize the utilization of the passenger compartment and provide flexibility in the number of flexible covers that could be utilized in varying configurations to prevent visibility into the rear cargo area, or to provide shading or floor protection. Even more, the cover system would not hinder storage of elongated items within the rear cargo area when the flexible covers are in an extended position.

SUMMARY OF THE INVENTION

In accordance with the purposes and benefits described herein, a vehicle having first and second seat rows supported by a floor and a lift gate for accessing a cargo area partially defined by the second seat row, the floor, and the lift gate is provided. The vehicle may be broadly described as including first and second flexible covers positioned within at least one cassette in a retracted position, the at least one cassette positioned adjacent a floor of the vehicle behind the second seat row.

In one possible embodiment, at least one of the first and second flexible covers includes a pass through door allowing for storage of elongated cargo when at least a portion of the second seat row is folded down. In another possible embodiment, the pass through door may be secured in a closed position by a zipper, a hook and loop fastener, at least one magnet, at least one snap, or other fastening means.

In still another possible embodiment, the first flexible cover extends rearward along the floor of the cargo area in a first extended position, and is secured to a scuff of the vehicle positioned adjacent the floor and a lower end of the lift gate.

In yet another possible embodiment, the first flexible cover extends substantially vertically behind the second seat row in a second extended position and is secured by a retainer in the second extended position, and the second flexible cover extends substantially vertically between the second seat row and the first flexible member and rearward above the first flexible cover, and is secured adjacent the lift gate, i.e., secured to the lift gate or to a quarter panel adjacent the lift gate, in a third extended position.

In another possible embodiment, the first flexible cover extends forward and is secured to or adjacent a head rest associated with the first seat row in a fourth extended position, and the second flexible cover extends rearward and is secured adjacent the lift gate, i.e., secured to the lift gate or to a quarter panel adjacent the lift gate, in a fifth extended position.

In one other possible embodiment, the first flexible cover is positioned within a first cassette in a retracted position and the second flexible cover is positioned within a second cassette in a retracted position, and the first cassette is secured to the vehicle and the second cassette is attached to the first cassette.

In another possible embodiment, the second cassette includes a pair of hooks and the first cassette includes a pair of apertures for receiving the pair of hooks and attaching the first cassette to the second cassette.

In yet another possible embodiment, the first flexible cover extends from the first cassette substantially vertically behind the second seat row in a second extended position and is secured by a retainer in the second extended position, and the second flexible cover extends from the second cassette substantially vertically between the second seat row and the first flexible member and rearward above the first flexible cover, and is secured adjacent the lift gate, i.e., secured to the lift gate or to a quarter panel adjacent the lift gate, in a third extended position.

In still another possible embodiment, the first flexible cover extends forward from the first cassette and is secured to or adjacent a head rest associated with the first seat row in a fourth extended position, and the second flexible cover extends rearward from the second cassette and is secured adjacent to the lift gate, i.e., secured to the lift gate or to a quarter panel adjacent the lift gate, in a fifth extended position.

In accordance with another possible embodiment, a vehicle having first and second seat rows supported by a floor and a lift gate for accessing a cargo area partially defined by the second seat row, the floor, and the lift gate includes a first flexible cover positioned within a first cassette in a retracted position. The first cassette is mounted to the vehicle adjacent a floor of the vehicle behind the second seat row and the first cassette is adapted for secure attachment to a second cassette having a second flexible cover therein in a retracted position.

In another possible embodiment, the vehicle includes a second cassette having a second flexible cover therein in a retracted position. In this embodiment, the first cassette includes at least one receiver for receiving at least one member extending from the second cassette when the first and second cassettes are attached.

In still another possible embodiment, the at least one member is hook shaped for locating and securing the first and second cassettes when the first and second cassettes are attached.

In accordance with another possible embodiment, a cover system for a vehicle cargo area includes a first cassette mounted to the vehicle adjacent a floor of the vehicle behind a second seat row, the first cassette having a first flexible cover positioned therein in a retracted position, and a second cassette attached to the first cassette, the second cassette having a second flexible cover positioned therein in a retracted position.

In another possible embodiment, at least one of the first and second flexible covers includes a pass through door allowing for storage of elongated cargo.

In still another, the first flexible cover extends rearward along a floor of the cargo area in a first extended position, and is secured in the extended position.

In yet another possible embodiment, the first flexible cover extends substantially vertically behind a second seat row in a second extended position and is secured in the second extended position, and the second flexible cover extends substantially vertically between the second seat row and the first flexible member, and rearward above the first flexible cover in a third extended position and is secured in the third extended position.

In still another possible embodiment, the first flexible cover extends forward and is secured to a first seat row in a fourth extended position, and the second flexible cover extends rearward and is secured in a fifth extended position.

A vehicle incorporating any of the cover systems for a vehicle cargo area described above.

In the following description, there are shown and described several embodiments of a cover system for a vehicle cargo area and a vehicle incorporating same. As it should be realized, the systems are capable of other, different embodiments and their several details are capable of modification in various, obvious aspects all without departing from the assemblies as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the cover system for a vehicle cargo area and together with the description serve to explain certain principles thereof. In the drawing figures.

Figure 6:
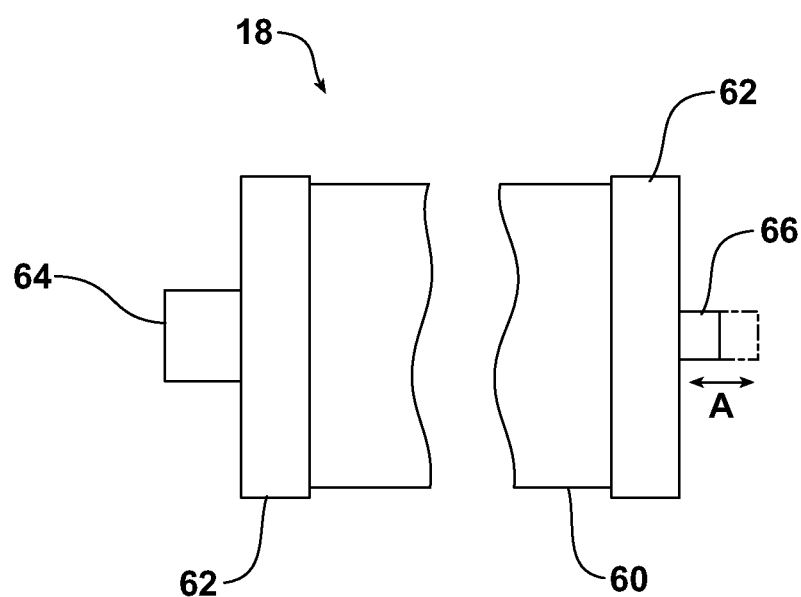
Figure 7:
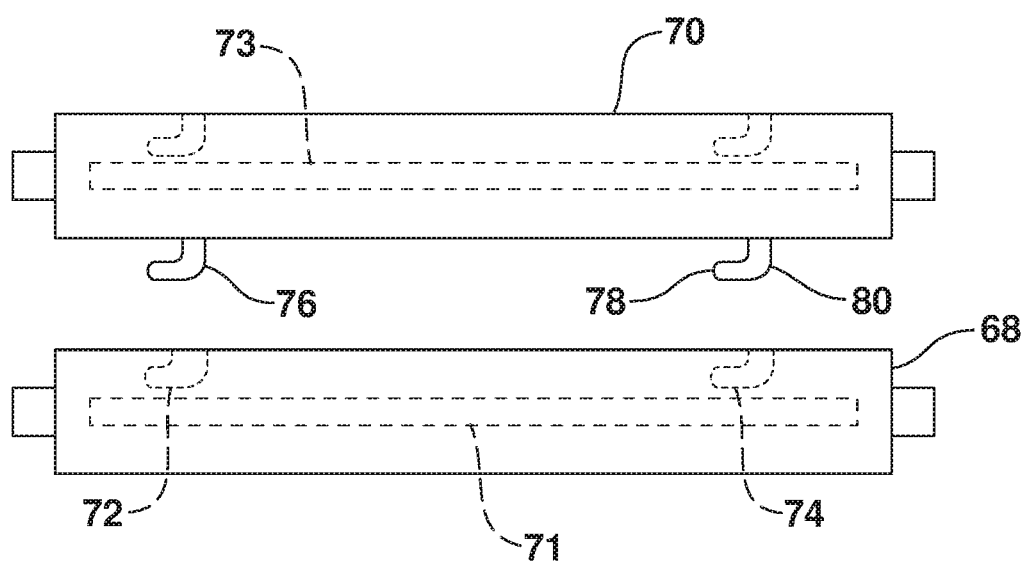

FIG. 6 is a partial side elevation view of a typical cassette having a flat pin at one end and a round pin at a second, spring loaded, end for mounting the cassette in the vehicle; and FIG. 7 is a side elevation view of a first cassette having a pair of openings therein for receiving a pair of hooks extending from a second cassette to secure and attach the first and second cassettes to allow utilization of one, two, or more cassettes depending on present need without unnecessarily utilizing cargo space when fewer cassettes are needed.

Reference will now be made in detail to the present preferred embodiments of the cover systems for a vehicle, examples of which are illustrated in the accompanying drawing figures, wherein like numerals are used to represent like elements.

DETAILED DESCRIPTION

Figure 1:
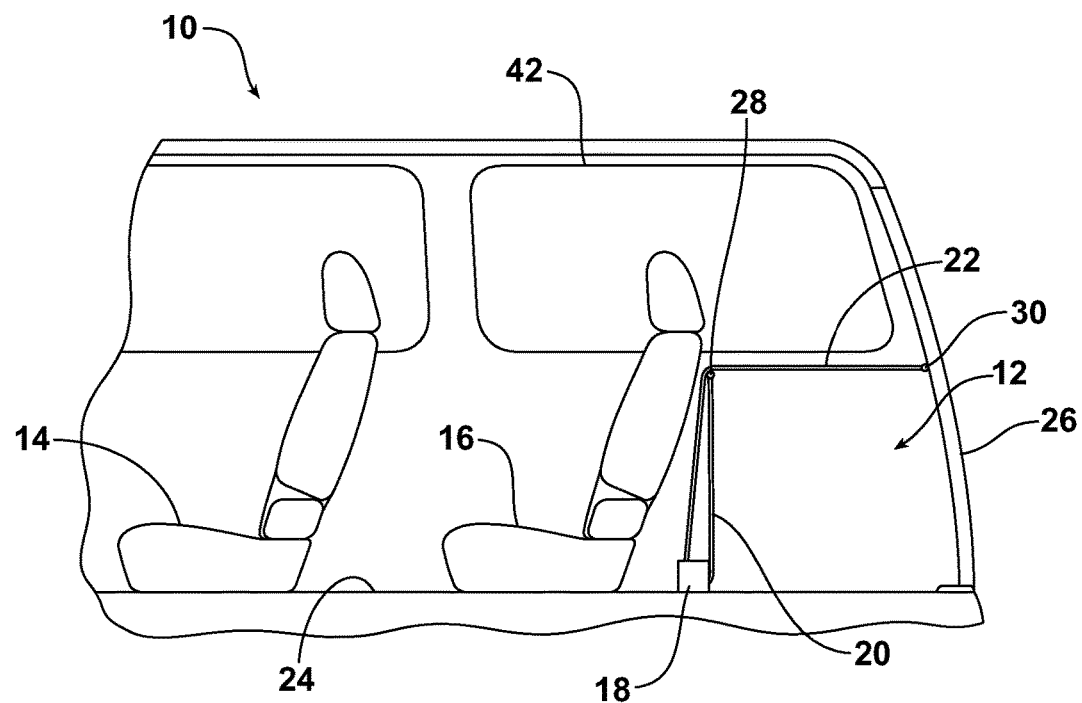
FIG. 1 is a partial perspective view of a typical vehicle having a rear cargo area showing first and second seat rows and a cassette having first and second flexible covers extending therefrom to prevent visibility into the rear cargo area.

Reference is now made to FIG. 1 which illustrates a typical vehicle 10 having a rear cargo area 12 showing first and second seat rows 14, 16 and a cassette 18 having first and second flexible covers 20, 22 extending therefrom to prevent visibility into the rear cargo area. The cargo area 12 is at least partially defined by the second seat row 16, a floor 24, and a rear lift gate 26. The first and second flexible covers 20, 22 are positioned within the cassette 18 in a retracted, or normal, position. As shown, the first flexible cover 20 is extended substantially vertically behind the second seat row 14 and is secured by a retainer 28 in this extended position. The second flexible cover 22 is extended substantially vertically between the second seat row 14 and the first flexible cover 20 and then, rearward above the first flexible cover and is secured by a retainer 30 to the lift gate in this extended position. In this configuration, the rear cargo area 12 is protected from view through one or more side windows (not shown) even when the second seat row 16 is fully or partially collapsed or folded down as shown in FIG. 2.

Figure 2:
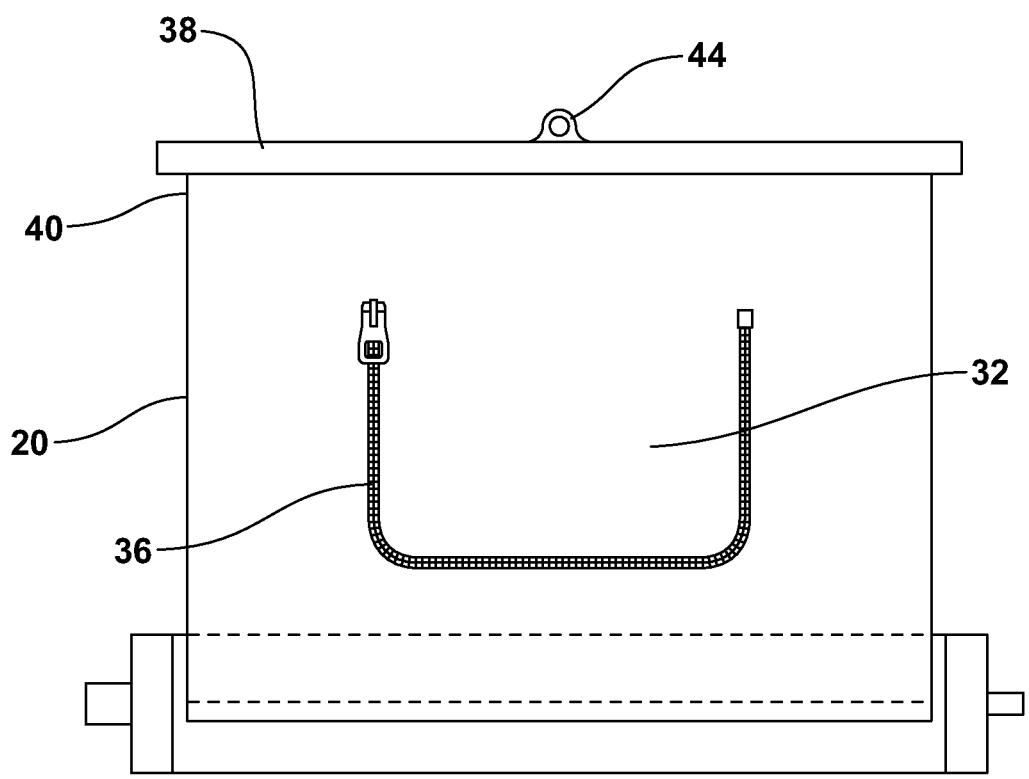
FIG. 2 is a front view of a typical flexible cover having an access door formed therein, in this instance the access door is secured in a closed position using a zipper.
Figure 3:
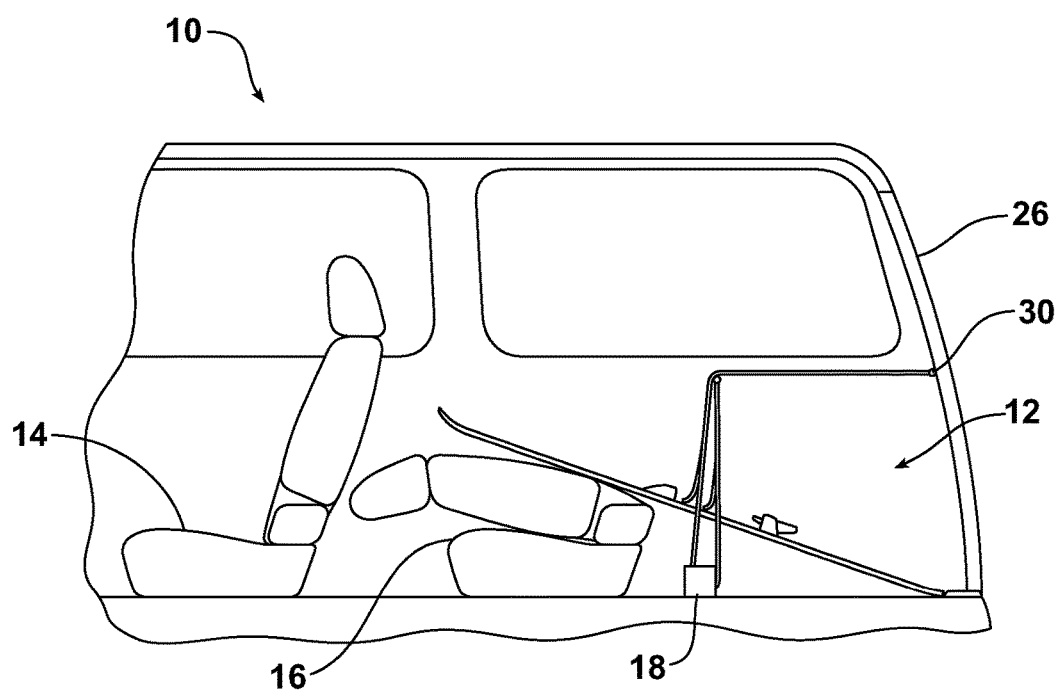
FIG. 3 is a partial perspective view of the vehicle showing a first seat row and a second seat row in a collapsed or folded down position such that elongated cargo, in this instance a pair of skis, stowed in the rear cargo area extends through the access doors of the first and second extended flexible covers.

As shown in FIG. 2, the first and second flexible covers 20, 22 potentially limit the utilization of the rear cargo area 12. In other words, when the second seat row 16 is folded down, the rear cargo area 12 is expanded to include the area above the second seat row. In order to fully utilize this additional cargo area, the first and second flexible covers 20, 22 include pass through doors. As best shown in FIG. 3, a pass through door 32 is a cutout 34 of the flexible cover which in this instance is the first flexible cover 20. In alternate embodiments, the cutout 34 may be secured to the flexible cover, i.e., first and/or second flexible covers 20, 22, utilizing a zipper 36, or alternatively, hook and loop fasteners, at least one magnet, at least one snap, or other known means of securing a flap in a closed position.

As shown, the first flexible cover 20 is in a vertically extended position. When installed in the vehicle 10, the cassette 18 would be positioned adjacent the floor 24 and behind the second seat row 16 as shown in FIG. 1. Further, a retaining rod 38 is attached to a distal end 40 of the first flexible cover 20 for securing the first flexible cover to the vehicle 10 in the extended position. In the described embodiment, the retaining rod 38 is attached in any known manner to the interior of the vehicle just below the quarter glass 42 of the vehicle. For example, the retaining rod 38 may include a flat pin and a spring loaded, round pin (not shown) which are received by appropriate receivers positioned within the interior of the vehicle. Alternatively, and depending on the attachment point within the vehicle 10, a loop 44 may extend from the retaining rod for attachment to a hook or the like positioned within the interior of the vehicle. For example, the second flexible cover 14 shown in FIG. 1 may be attached to the rear lift gate 26 utilizing the loop 44 and a mating hook (not shown) associated with the rear lift gate. The second flexible cover 14 may also be attached adjacent the rear lift gate 26, on a quarter panel (not shown) utilizing a loop and a mating hook associated with the quarter panel.

Figure 4:
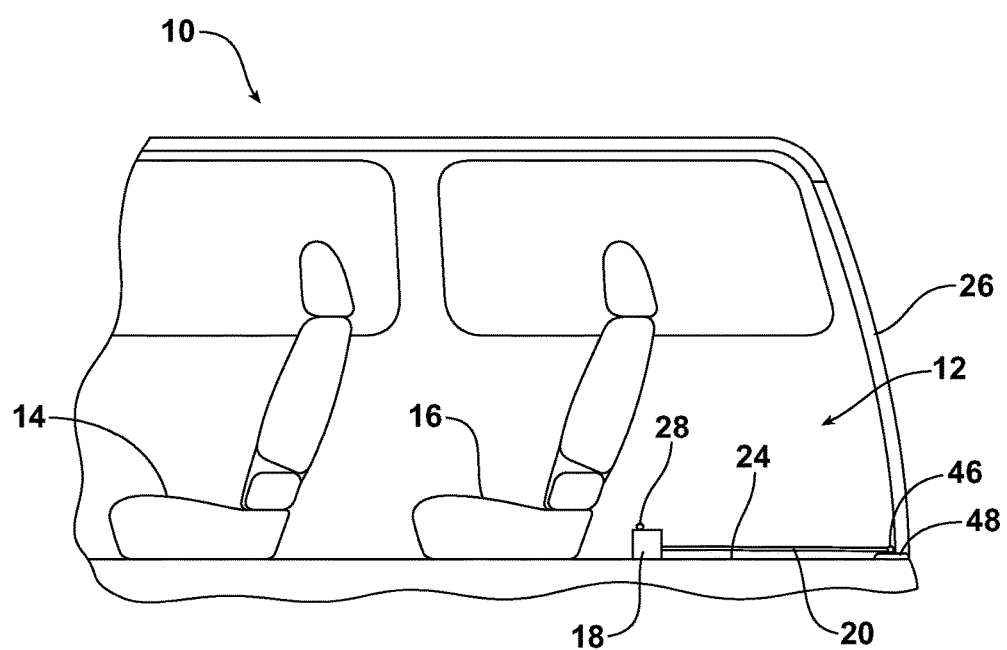
FIG. 4 is a partial perspective view of the vehicle showing the first flexible cover in an extended position and attached to a scuff adjacent a rear lift gate.

In another configuration shown in FIG. 4, the cassette 18 is positioned adjacent the floor 24 and behind the second seat row 16 as shown in FIG. 1. The first flexible cover 20, however, is extended substantially horizontally along the floor 24 and is secured by a retainer 46, in this extended position, to a scuff 48. The scuff 48, in this described embodiment, includes a hook (not shown) for mating with a tab (e.g., loop 44) attached to the retaining rod 38 of the first flexible cover 20. In this configuration, the second flexible cover 22 remains in anon-extended position within cassette 18, and the first flexible cover 20 provides protection for the floor/carpet along the rear cargo area 12.

Figure 5:
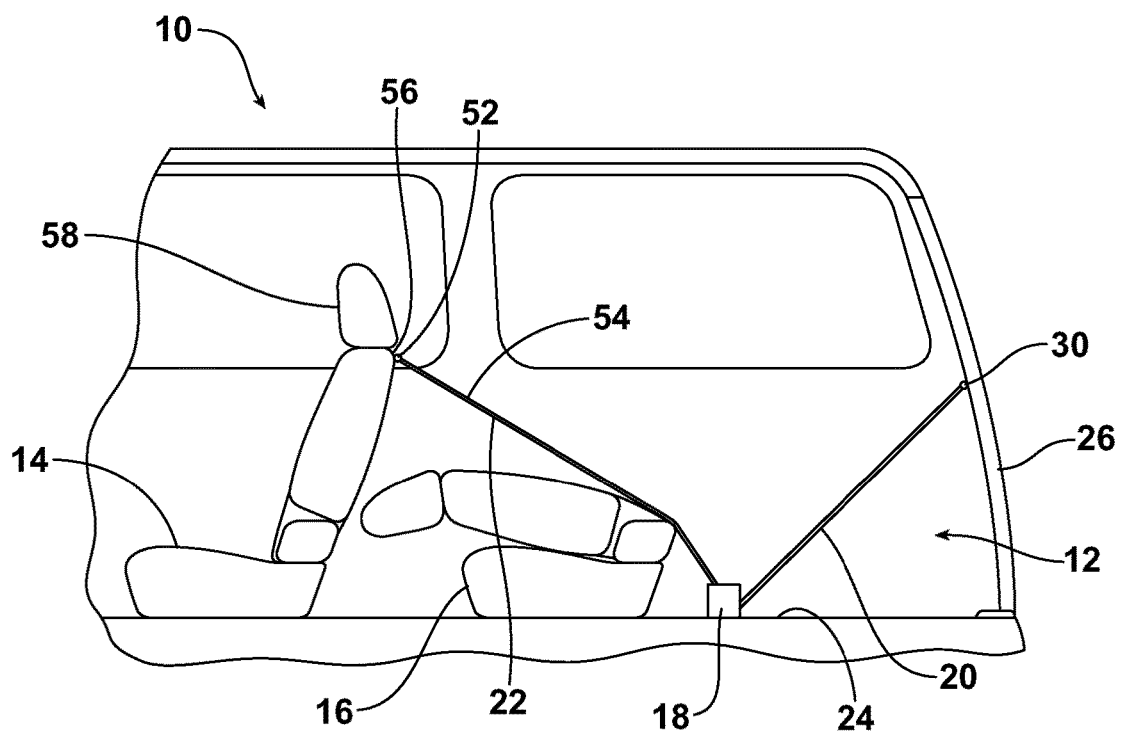
FIG. 5 is a partial perspective view of the vehicle showing the first flexible cover in an extended position and attached to the rear lift gate and the second flexible cover in an extended position and attached to or adjacent a rear head rest of the first seat row when the second seat row is folded down.

In still another configuration shown in FIG. 5, the cassette 18 remains positioned adjacent the floor 24 and behind the second seat row 16. The first flexible cover 20, however, is extended substantially diagonally upward and is secured by the retainer 30 to the lift gate 26 in this extended position. In this configuration, the second flexible cover 22 is similarly extended but in a forward direction over a folded down rear seat row 16. Similar to the first flexible cover 20, a retaining rod 52 is attached to a distal end 54 of the second flexible cover 22 for securing the second flexible cover to the vehicle 10 in the extended position. The retaining rod 52 includes a tab 56 attached thereto for mating with a hook (not shown) or the like adjacent a head rest 58 of the first seat row 14, or to a support of the head rest 58.

Although the described embodiments utilize a retaining rod associated with a distal end of the flexible covers including hooks and loops for securing the flexible covers in extended positions within the vehicle, any known means of securing the flexible covers in the extended positions may be utilized in accordance with the teaching of the present invention. For example, the retaining rods may include one or more hooks thereon which mate with loops associated with the scuff, one or more head rests, and/or the lift gate. Even more, the retaining rods may include end caps having slots for receiving pins or the like extending into the vehicle interior at attachment points throughout the rear cargo area or elsewhere within the vehicle. The slots of the retaining rods may be slid onto the pins for example and may include a locking feature. Alternatively, the rods may include a flat pin and an extendable round pin (similar to a window blind) that are removeably received within the vehicle interior.

As shown in FIG. 6, the cassette 18 includes a housing 60 wherein the first and second flexible covers 20, 22 are positioned in the retracted position. As described above, the cassette 18 is positioned adjacent the floor 24 and behind the second seat row 16 within the rear cargo area 12 in the described embodiment. In other embodiments, the cassette 18 may be positioned at different locations throughout the vehicle depending on the desired utilization of the first and second flexible covers 20, 22. In one embodiment, the cassette 18 may be permanently attached to the floor 24 of the vehicle 10 although the flexibility provided by the described cover system would be significantly underutilized in such an arrangement. Accordingly, the cassette 18 is typically removeably attached to the vehicle 10.

As described above with regard to the retaining rod, any known means of securing the cassette 18 to the vehicle may be utilized in accordance with the teaching of the present invention. In the described embodiment, the cassette includes end caps 62 with pins 64, 66 extending therefrom. Pin 64 is a flat pin and pin 66 is an extendable round pin (similar to a window blind), as shown by action arrow A, in order to allow removal of the cassette 18 when not in use. The pins 64, 66 are inserted into suitable receivers (not shown) positioned along vehicle side walls adjacent the floor 24 behind the second seat row 16 and elsewhere, as desired. Accordingly, the cassette 18 may be moved to different locations within the rear cargo area 12 or otherwise and secured in position utilizing similar receivers. In an alternate embodiment, the end caps 62 of the cassette 18 may include slots for receiving pins or the like extending into the vehicle interior at attachment points throughout the rear cargo area 12 or elsewhere within the vehicle 10. The slots of the end caps 62 may be slid onto the pins, for example, and may include a locking feature.

As shown in FIG. 7, the cassette 18 may be formed utilizing two or more individual cassettes (e.g., cassettes 68 and 70). Each such individual cassette 68 and 70 includes a flexible cover 71 and 73, respectively (shown in dashed line) in a retracted position. As described above, the individual cassette 68 may be permanently attached adjacent the floor 24 of the vehicle 10 and behind the second seat row 16 within the rear cargo area 12. Alternatively, the individual cassette 68 may be removeably attached and may be positioned at different locations throughout the vehicle depending on the desired utilization of the flexible covers. In one embodiment, the cassette 18 may be permanently attached to the floor 24 of the vehicle 10.

The utilization of individual cassettes 68, 70 minimizes the utilization of the passenger compartment/rear cargo area and provides flexibility in the number of flexible covers that could be utilized in varying configurations to prevent visibility into the rear cargo area, or to provide shading or floor protection. Rather than attach each individual cassette 68, 70 to the vehicle as described above, the first individual cassette (e.g., individual cassette 68) is adapted for secure attachment to the second individual cassette (e.g., individual cassette 70). In this described embodiment, the first individual cassette 68 includes at least one receiver for receiving at least one member extending from the second individual cassette 70.

As shown, the first individual cassette 68 includes a pair of receivers in the form of apertures 72, 74 which are generally hook-shaped for locating and securing the first and second individual cassettes. Aperture 72 is longer to receive a member, or mating hook 76, extending from the second individual cassette 70. Aperture 74 is similar but shorter as an end 78 of hook 80 is allowed to enter the aperture 74 on an angle in this configuration. Once hooks 76 and 80 are positioned within apertures 72 and 74, the first and second individual cassettes 68 and 70 are securely attached. In an embodiment where three or more individual cassettes and flexible covers are desired, additional individual cassettes can be attached to the second individual cassette, and so on, in the same manner described.

In summary, numerous benefits result from a cover system for a vehicle as illustrated in this document. The cover system is capable of preventing visibility into the rear cargo area even when the second seat row, or even a portion of the second seat row in the situation where multiple seats form the row, is folded down. The cover system also minimizes the utilization of the passenger compartment and provides flexibility in the number of flexible covers that could be utilized in varying configurations to prevent visibility into the rear cargo area, or to provide shading or floor protection. Even more, the cover system includes pass through doors which do not hinder storage of elongated items within the rear cargo area when the flexible covers are in an extended position.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A vehicle having first and second seat rows supported by a floor and a lift gate for accessing a cargo area partially defined by the second seat row, the floor, and the lift gate, comprising:
first and second flexible covers positioned within at least one cassette in a retracted position, said at least one cassette positioned adjacent a floor of the vehicle behind the second seat row.

2. The vehicle of claim 1, wherein at least one of said first and second flexible covers includes a pass through door allowing for storage of elongated cargo when at least a portion of the second seat row is folded down.

3. The vehicle of claim 2, wherein said pass through door is secured in a closed position by a zipper, a hook and loop fastener, at least one magnet, or at least one snap.

4. The vehicle of claim 1, wherein said first flexible cover extends rearward along the floor of the cargo area in a first extended position, and is secured to a scuff of the vehicle positioned adjacent the floor and a lower end of the lift gate.

5. The vehicle of claim 1, wherein said first flexible cover extends substantially vertically behind said second seat row in a second extended position and is secured by a retainer in the second extended position, and wherein said second flexible cover extends substantially vertically between said second seat row and said first flexible member and rearward above said first flexible cover, and is secured adjacent the lift gate in a third extended position.

6. The vehicle of claim 5, wherein said first and second flexible covers each include a pass through door allowing for storage of elongated cargo when at least a portion of the second seat row is folded down.

7. The vehicle of claim 1, wherein said first flexible cover extends forward and is secured to a head rest associated with the first seat row in a fourth extended position, and wherein said second flexible cover extends rearward and is secured adjacent the lift gate in a fifth extended position.

8. The vehicle of claim 1, wherein said first flexible cover is positioned within a first cassette in a retracted position and said second flexible cover is positioned within a second cassette in a retracted position, and wherein said first cassette is secured to the vehicle and said second cassette is attached to said first cassette.

9. The vehicle of claim 8, wherein said second cassette includes a pair of hooks and said first cassette includes a pair of apertures for receiving said pair of hooks and attaching said first cassette to said second cassette.

10. The vehicle of claim 9, wherein at least one of said first and second flexible covers includes a pass through door allowing for storage of elongated cargo when at least a portion of the second seat row is folded down.

11. The vehicle of claim 9, wherein said first flexible cover extends rearward along the floor of the cargo area in a first extended position, and is secured to a scuff of the vehicle positioned adjacent the floor and a lower end of the lift gate.

12. The vehicle of claim 9, wherein said first flexible cover extends substantially vertically behind said second seat row in a second extended position and is secured by a retainer in the second extended position, and wherein said second flexible cover extends substantially vertically between said second seat row and said first flexible member and rearward above said first flexible cover, and is secured adjacent the lift gate in a third extended position.

13. The vehicle of claim 9, wherein said first flexible cover extends forward and is secured to a head rest associated with the first seat row in a fourth extended position, and wherein said second flexible cover extends rearward and is secured adjacent the lift gate in a fifth extended position.

14. A vehicle having first and second seat rows supported by a floor and a lift gate for accessing a cargo area partially defined by the second seat row, the floor, and the lift gate, comprising:
a first flexible cover positioned within a first cassette in a retracted position, said first cassette mounted to the vehicle adjacent a floor of the vehicle behind the second seat row, and
wherein said first cassette is adapted for secure attachment to a second cassette having a second flexible cover therein in a retracted position.

15. The vehicle of claim 14, further comprising a second cassette having a second flexible cover therein in a retracted position; and
wherein said first cassette includes at least one receiver for receiving at least one member extending from said second cassette when said first and second cassettes are attached.

16. The vehicle of claim 15, where said at least one member is hook shaped for locating and securing said first and second cassettes when said first and second cassettes are attached.

17. A cover system for a vehicle cargo area, comprising:
a first cassette mounted to the vehicle adjacent a floor of the vehicle behind a second seat row, said first cassette having a first flexible cover positioned therein in a retracted position; and
a second cassette attached to said first cassette, said second cassette having a second flexible cover positioned therein in a retracted position.

18. The cover system for a vehicle cargo area of claim 17, wherein at least one of said first and second flexible covers includes a pass through door allowing for storage of elongated cargo.

19. The cover system for a vehicle cargo area of claim 17, wherein said first flexible cover extends rearward along a floor of the cargo area in a first extended position, and is secured in the extended position.

20. The cover system for a vehicle cargo area of claim 17, wherein said first flexible cover extends substantially vertically behind a second seat row in a second extended position and is secured in the second extended position, and wherein said second flexible cover extends substantially vertically between the second seat row and said first flexible member and rearward above said first flexible cover in a third extended position, and is secured in the third extended position.

* * * * *